United States Patent
Lu et al.

(10) Patent No.: US 9,955,141 B2
(45) Date of Patent: *Apr. 24, 2018

(54) PORTABLE THREE-DIMENSIONAL SCANNER AND METHOD OF GENERATING A THREE-DIMENSIONAL SCAN RESULT CORRESPONDING TO AN OBJECT

(71) Applicant: eYs3D Microelectronics, Co., Taipei (TW)

(72) Inventors: Chao-Chun Lu, Taipei (TW); Wen-Kuo Lin, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/697,647

(22) Filed: Apr. 28, 2015

(65) Prior Publication Data

US 2015/0312552 A1 Oct. 29, 2015

Related U.S. Application Data

(60) Provisional application No. 61/985,474, filed on Apr. 29, 2014.

(30) Foreign Application Priority Data

Aug. 11, 2014 (TW) .............................. 103127562 A

(51) Int. Cl.
*H04N 13/02* (2006.01)
*H04N 5/225* (2006.01)
(Continued)

(52) U.S. Cl.
CPC ......... *H04N 13/0239* (2013.01); *G06T 7/521* (2017.01); *G06T 7/579* (2017.01);
(Continued)

(58) Field of Classification Search
CPC .............. G06T 7/0075; H04N 13/0239; H04N 13/0246; H04N 13/0253; H04N 13/0271;
(Continued)

(56) References Cited

U.S. PATENT DOCUMENTS

| 4,607,290 A | 8/1986 | Murakami |
| 6,549,650 B1 | 4/2003 | Ishikawa |

(Continued)

FOREIGN PATENT DOCUMENTS

| CN | 102681295 A | 9/2012 |
| CN | 102918858 A | 2/2013 |

(Continued)

*Primary Examiner* — Jamie Atala
*Assistant Examiner* — James Boylan
(74) *Attorney, Agent, or Firm* — Winston Hsu

(57) ABSTRACT

A portable three-dimensional scanner includes at least two image sensing units and a depth map generation unit. When the portable three-dimensional scanner is moved around an object, a first image sensing unit and a second image sensing unit of the at least two image sensing units capture a plurality of first images comprising the object and a plurality of second images comprising the object, respectively. When the first image sensing unit captures each first image of the plurality of first images, a corresponding distance exists between the portable three-dimensional scanner and the object. The depth map generation unit generates a corresponding depth map according to the each first image and a corresponding second image. A plurality of depth maps generated by the depth map generation unit, the plurality of first images, and the plurality of second images are used for generating a color three-dimensional scan result corresponding to the object.

34 Claims, 12 Drawing Sheets

(51) Int. Cl.
*H04N 17/00* (2006.01)
*G06T 7/521* (2017.01)
*G06T 7/579* (2017.01)
*G06T 7/593* (2017.01)
*H04N 13/00* (2018.01)

(52) U.S. Cl.
CPC ............ *G06T 7/593* (2017.01); *H04N 5/2258* (2013.01); *H04N 13/0246* (2013.01); *H04N 13/0253* (2013.01); *H04N 13/0271* (2013.01); *H04N 13/0282* (2013.01); *H04N 17/002* (2013.01); *H04N 2013/0081* (2013.01)

(58) Field of Classification Search
CPC ....... H04N 13/0282; H04N 2013/0081; H04N 5/2258
USPC .......................................................... 348/51
See application file for complete search history.

(56) References Cited

U.S. PATENT DOCUMENTS

| | | | |
|---|---|---|---|
| 6,714,665 B1* | 3/2004 | Hanna | G06K 9/00 382/106 |
| 6,809,771 B1 | 10/2004 | Hamaguchi et al. | |
| 2002/0018062 A1* | 2/2002 | Hamaguchi | G06T 7/593 345/419 |
| 2004/0150728 A1 | 8/2004 | Ogino | |
| 2008/0030816 A1* | 2/2008 | Jang | H04N 1/40012 358/530 |
| 2010/0149550 A1* | 6/2010 | Diefenbacher | G01B 11/24 356/601 |
| 2011/0199650 A1* | 8/2011 | Okamura | H04N 1/40 358/444 |
| 2011/0310980 A1 | 12/2011 | Mathew | |
| 2012/0213503 A1* | 8/2012 | Gustaffson | H04N 5/2354 396/164 |
| 2013/0057655 A1* | 3/2013 | Su | G02B 7/30 348/47 |
| 2013/0076856 A1* | 3/2013 | Wakabayashi | G03B 35/10 348/36 |
| 2013/0209082 A1* | 8/2013 | Cameron | H04N 13/0285 396/323 |
| 2014/0098194 A1* | 4/2014 | Goma | H04N 5/23212 348/47 |
| 2014/0104387 A1 | 4/2014 | Klusza | |
| 2014/0198184 A1* | 7/2014 | Stein | G06K 9/00791 348/47 |
| 2014/0225985 A1* | 8/2014 | Klusza | H04N 13/0207 348/43 |
| 2016/0025327 A1* | 1/2016 | Abe | G03B 21/204 348/744 |

FOREIGN PATENT DOCUMENTS

| | | |
|---|---|---|
| JP | H07123311 A | 5/1995 |
| JP | H07174553 A | 7/1995 |
| JP | H1091790 A | 4/1998 |
| JP | H11341522 A | 12/1999 |
| JP | 2000339467 A | 12/2000 |
| JP | 200112910 A | 1/2001 |
| JP | 200116621 A | 1/2001 |
| JP | 200159706 A | 3/2001 |
| JP | 2012194126 A | 10/2012 |
| JP | 201315519 A | 1/2013 |
| TW | 201039048 | 11/2010 |
| TW | 201227602 | 7/2012 |
| TW | 201230773 | 7/2012 |
| TW | 201248515 | 12/2012 |
| TW | M443156 | 12/2012 |
| TW | 201411414 | 3/2014 |

* cited by examiner

PORTABLE THREE-DIMENSIONAL SCANNER AND METHOD OF GENERATING A THREE-DIMENSIONAL SCAN RESULT CORRESPONDING TO AN OBJECT

CROSS REFERENCE TO RELATED APPLICATIONS

This application claims the benefit of U.S. Provisional Application No. 61/985,474, filed on Apr. 29, 2014 and entitled "3D object extraction/reconstruction apparatus," the contents of which are incorporated herein by reference.

BACKGROUND OF THE INVENTION

1. Field of the Invention

The present invention relates to a portable three-dimensional scanner and a method of generating a three-dimensional scan result corresponding to an object, and particularly to a portable three-dimensional scanner and a method of generating a three-dimensional scan result corresponding to an object that can make a first image sensing unit and a second image sensing unit of the portable three-dimensional scanner be swung with a distance between the first image sensing unit and the scanned object, or make a baseline between the first image sensing unit and the second image sensing unit be changed with the distance between the first image sensing unit and the scanned object to get a better scanning resolution.

2. Description of the Prior Art

In the prior art, a stereo scanner with fixed image sensing units can be utilized to scan an object which is rotated 360 degrees to generate a three-dimensional scan result corresponding to the object. To get a better scanning resolution of the object, the object needs to be located at an intersection of a first line determined by a center of an image sensing unit of the stereo scanner and the object and a second line determined by a center of another image sensing unit of the stereo scanner and the object. Thus, the above mentioned location of the object and a fixed distance between the stereo scanner and the object further restrict a size of the object. Because the distance between the stereo scanner and the object corresponds to a baseline between the two image sensing units of the stereo scanner and an angle between the first line and the second line, some stereo scanners provided by the prior art can be additionally installed a predetermined light source to get the better scanning resolution of the object, wherein the predetermined light source can emit laser light or have a predetermined light pattern. However, the above mentioned stereo scanners with the predetermined light source only generate a monochromatic light three-dimensional scan result corresponding to the object. Therefore, the prior art is not a good choice for a user.

SUMMARY OF THE INVENTION

An embodiment provides a portable three-dimensional scanner. The portable three-dimensional scanner includes at least two image sensing units and a depth map generation unit. When the portable three-dimensional scanner is moved around an object, a first image sensing unit of the at least two image sensing units captures a plurality of first images including the object, and a second image sensing unit of the at least two image sensing units captures a plurality of second images including the object, wherein each first image of the plurality of first images corresponds to a second image of the plurality of second images, and when the first image sensing unit captures the each first image, a corresponding distance exists between the portable three-dimensional scanner and the object, wherein the plurality of first images or the plurality of second images are color images, and the corresponding distance is varied with time. The depth map generation unit is used for generating a corresponding depth map according to the each first image and the second image, wherein a plurality of depth maps generated by the depth map generation unit according to the plurality of first images and the plurality of second images, the plurality of first images, and the plurality of second images are used for generating a color three-dimensional scan result corresponding to the object.

Another embodiment provides a method of generating a three-dimensional scan result corresponding to an object, wherein a portable three-dimensional scanner applied to the method includes at least two image sensing units and a depth map generation unit. The method includes when the portable three-dimensional scanner is moved around the object, a first image sensing unit of the at least two image sensing units captures a plurality of first images including the object, and a second image sensing unit of the at least two image sensing units captures a plurality of second images including the object, wherein each first image of the plurality of first images corresponds to a second image of the plurality of second images, and when the first image sensing unit captures the each first image, a corresponding distance exists between the portable three-dimensional scanner and the object, wherein the plurality of first images or the plurality of second images are color images, and the corresponding distance is varied with time; the depth map generation unit generating a corresponding depth map according to the each first image and the second image; and generating and outputting a color three-dimensional scan result corresponding to the object according to a plurality of depth maps generated by the depth map generation unit, the plurality of first images, and the plurality of second images.

The present invention provides a portable three-dimensional scanner and a method of generating a three-dimensional scan result corresponding to an object. The portable three-dimensional scanner and the method make a first image sensing unit and a second image sensing unit be swung to let the object be always located at an intersection of a line determined by a center of the first image sensing unit and the object and a line determined by a center of the second image sensing unit and the object, or make a baseline between the first image sensing unit and the second image sensing unit be varied with a distance between the first image sensing unit of the portable three-dimensional scanner and the object to let the object be always located at the intersection of the line determined by the center of the first image sensing unit and the object and the line determined by the center of the second image sensing unit and the object, or make the first image sensing unit and the second image sensing unit be swung and the baseline between the first image sensing unit and the second image sensing unit be varied with the distance between the first image sensing unit of the portable three-dimensional scanner and the object to let the object be always located at the intersection of the line determined by the center of the first image sensing unit and the object and the line determined by the center of the second image sensing unit and the object when the first image sensing unit captures the plurality of first images including the object and the second image sensing unit captures the plurality of second images including the object. In addition, the plurality of first images or the plurality of second images are color images, and the distance between the first image sensing unit of the portable three-dimensional scanner and the object is varied with time. Therefore, compared to the prior art, no matter how the object is moved or rotated, the portable three-dimensional scanner and the method provided by the present invention can always make the object be located at the intersection of the line determined by the center of the first image sensing unit and the object and the line determined by the center of the second image sensing unit and the object to obtain a better scanning resolution of the object. In addition, because the first image sensing unit and the second image sensing unit can be swung or the baseline between the first image sensing unit and the second image sensing unit is varied with the distance between the first image sensing unit of the portable three-dimensional scanner and the object, compared to the prior art, a size of the object can be less restricted.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
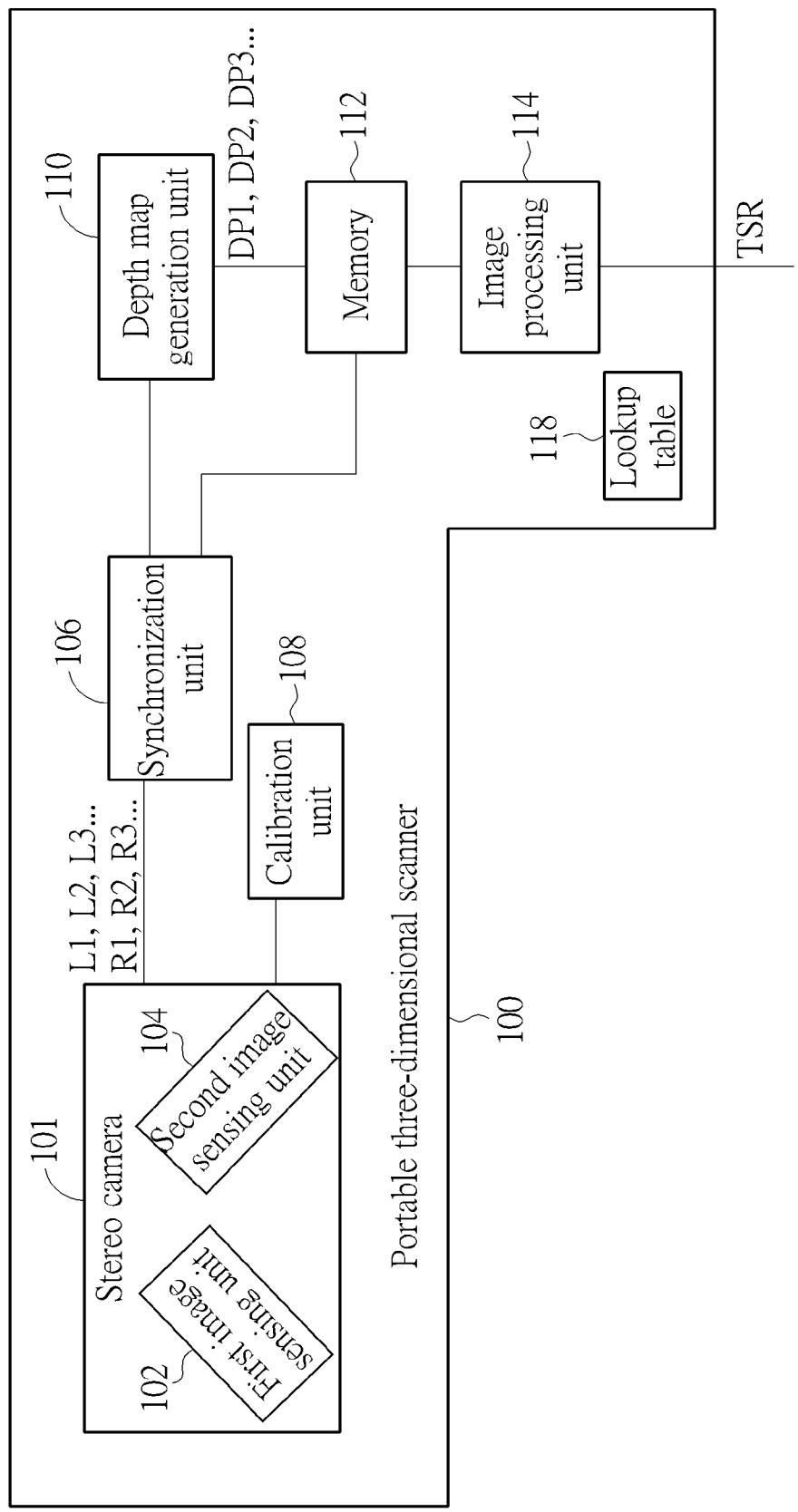
FIG. 1 is a diagram illustrating a portable three-dimensional scanner according to a first embodiment.
Figure 2:
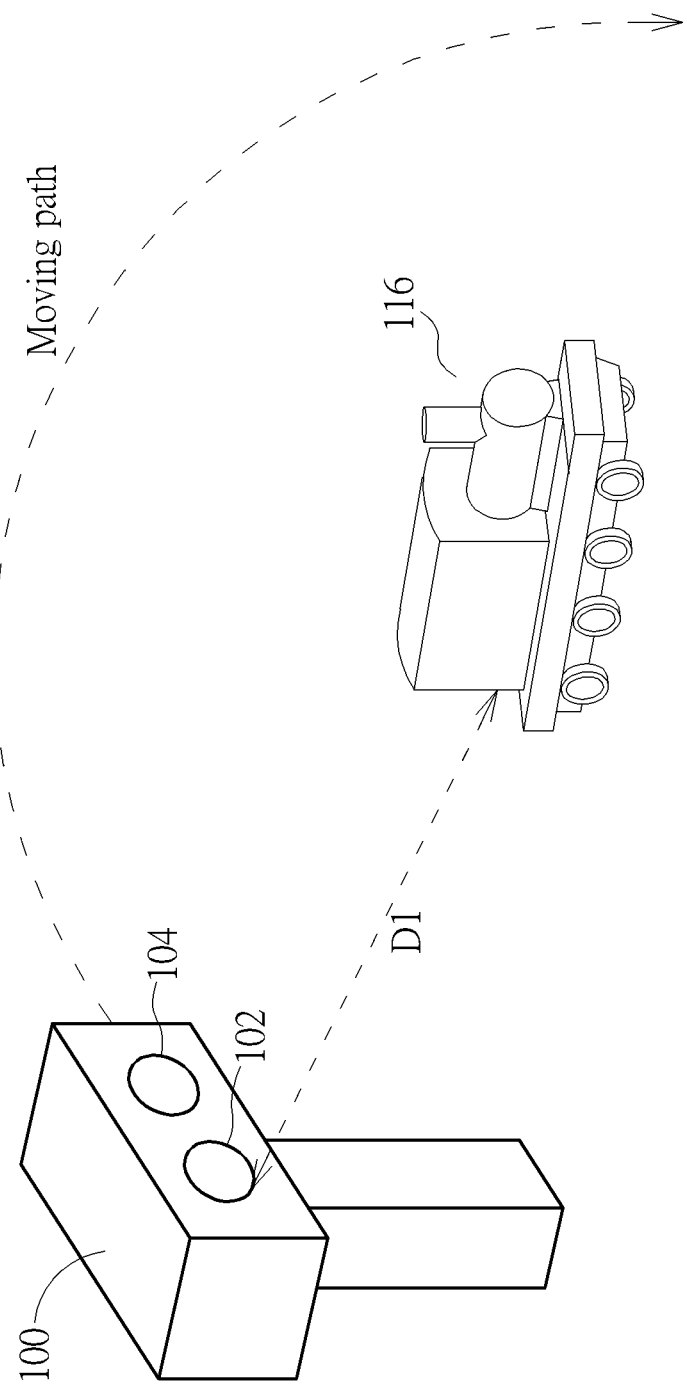
FIG. 2 is a diagram illustrating the portable three-dimensional scanner which is moved around object.

Please refer to FIG. 1. FIG. 1 is a diagram illustrating a portable three-dimensional scanner 100 according to a first embodiment. As shown in FIG. 1, the portable three-dimensional scanner 100 includes a first image sensing unit 102, a second image sensing unit 104, a synchronization unit 106, a calibration unit 108, a depth map generation unit 110, a memory 112, and an image processing unit 114, wherein the image sensing units 102, 104 can be optionally included in a stereo camera 101. In addition, the present invention is not limited to the portable three-dimensional scanner 100 only including the first image sensing unit 102 and the second image sensing unit 104. That is to say, the portable three-dimensional scanner 100 can include at least two image sensing units. When the portable three-dimensional scanner 100 is moved around an object 116 (as shown in FIG. 2), the first image sensing unit 102 captures a plurality of first images L1, L2, L3, . . . including the object 116, and the second image sensing unit 104 captures a plurality of second images R1, R2, R3, . . . including the object 116, wherein each first image (e.g. a first image L1) of the plurality of first images L1, L2, L3, . . . corresponds to a second image (e.g. a second image R1) of the plurality of second images R1, R2, R3, . . . , the portable three-dimensional scanner 100 is not limited to a profile thereof shown in FIG. 2, the plurality of first images L1, L2, L3, . . . and the plurality of second images R1, R2, R3, . . . are RGB images or YUV images, and the plurality of first images L1, L2, L3, . . . are left eye images and the plurality of second images R1, R2, R3, . . . are right eye images. But, the present invention is not limited to the plurality of first images L1, L2, L3, . . . and the plurality of second images R1, R2, R3, . . . being RGB images or YUV images. That is to say, the plurality of first images L1, L2, L3, . . . and the plurality of second images R1, R2, R3, . . . can be other types of color images. As shown in FIG. 1, the synchronization unit 106 is coupled between the first image sensing unit 102, the second image sensing unit 104, and the depth map generation unit 110 for outputting a first synchronization signal to each first image (e.g. the first image L1) of the plurality of first images L1, L2, L3, . . . , and a corresponding second synchronization signal to a corresponding second image (e.g. the second image R1) of the plurality of second images R1, R2, R3, . . . , wherein a frequency of the first synchronization signal outputted by the synchronization unit 106 and a frequency of the second synchronization signal outputted by the synchronization unit 106 are varied with a resolution of the first image L1 and a resolution of the second image R1, respectively, and the first synchronization signal and the corresponding second synchronization signal are the same or different. In addition, in the portable three-dimensional scanner 100, each first image of the plurality of first images L1, L2, L3, . . . corresponds to a first synchronization signal. But, in another embodiment of the present invention, the first image L1 and the second image R1 can be divided into a plurality of image blocks according to scan lines of the first image sensing unit 102, respectively, wherein the synchronization unit 106 can output a synchronization signal to each image block of a plurality of image blocks of the first image L1, and the synchronization unit 106 can also output a corresponding synchronization signal to a corresponding image block of a plurality of image blocks of the second image R1. In addition, in another embodiment of the present invention, the portable three-dimensional scanner 100 further includes a register, and the register is used for storing an image block of the first image L1 corresponding to each scan line of the first image sensing unit 102 and a corresponding image block of the second image R1, wherein after the register completely stores image blocks of the first image L1 corresponding to scan lines of the first image sensing unit 102 and corresponding image blocks of the second image R1, the register outputs the first image L1 and the second image R1 according to a system clock of the portable three-dimensional scanner 100, and when the portable three-dimensional scanner 100 has the register, the synchronization unit 106 can be neglected. The calibration unit 108 is coupled to the first image sensing unit 102 and the second image sensing unit 104, before the first image sensing unit 102 outputs each first image (e.g. the first image L1) of the plurality of first images L1, L2, L3, . . . and the second image sensing unit 104 outputs a corresponding second image (e.g. the second image R1) of the plurality of second images R1, R2, R3, . . . , the calibration unit 108 executes calibration processing on the first image L1 and the second image R1, wherein the calibration processing includes a combination of a color space calibration and an assembly calibration. But, in another embodiment of the present invention, the synchronization unit 106 and the calibration unit 108 can be integrated into the stereo camera 101. That is to say, the stereo camera 101 can directly generate and output the plurality of first images L1, L2, L3, . . . and the plurality of second images R1, R2, R3, . . . which are executed the calibration processing by the calibration unit 108 to the depth map generation unit 110. Further, in another embodiment of the present invention, the calibration unit 108 executes the calibration processing on the first image L1 and the second image R1 after the first image sensing unit 102 outputs each first image (e.g. the first image L1) of the plurality of first images L1, L2, L3, . . . and the second image sensing unit 104 outputs a corresponding to second image (e.g. the second image R1) of the plurality of second images R1, R2, R3, . . . . As shown in FIG. 1, after the depth map generation unit 110 receives the plurality of first images L1, L2, L3, . . . and the plurality of second images R1, R2, R3, . . . , the depth map generation unit 110 can process the first image L1 and the second image R1 together to generate a corresponding depth map DP1 according to the first synchronization signal and the second synchronization signal. That is to say, the depth map generation unit 110 can generate the depth map DP1 according to each scan line of the first image L1 and a corresponding scan line of the second image R1 in turn. Thus, the depth map generation unit 110 can generate a plurality of depth maps DP1, DP2, DP3, . . . according to the plurality of first images L1, L2, L3, . . . and the plurality of second images R1, R2, R3, . . . . As shown in FIG. 2, because the portable three-dimensional scanner 100 is moved around the object 116 to scan the object 116, the plurality of depth maps DP1, DP2, DP3, . . . can correspond to different view angles. As shown in FIG. 1, the memory 112 is coupled to the synchronization unit 106 and the depth map generation unit 110 for storing the plurality of first images L1, L2, L3, . . . , the plurality of second images R1, R2, R3, . . . , and the plurality of depth maps DP1, DP2, DP3, . . . . However, if the synchronization unit 106 and the calibration unit 108 are integrated into the stereo camera 101, the memory 112 is coupled to the stereo camera 101 and the depth map generation unit 110 for storing the plurality of first images L1, L2, L3, . . . , the plurality of second images R1, R2, R3, . . . , and the plurality of depth maps DP1, DP2, DP3, . . . . As shown in FIG. 1, the image processing unit 114 is coupled to the memory 112 for generating and outputting a color three-dimensional scan result TSR corresponding to the object 116 according to the plurality of first images L1, L2, L3, . . . , the plurality of second images R1, R2, R3, . . . , and the plurality of depth maps DP1, DP2, DP3, . . . . But, in another embodiment of the present invention, the image processing unit 114 real time generates and outputs a part of the color three-dimensional scan result TSR corresponding to the object 116 according to each first image (e.g. the first image L1) of the plurality of first images L1, L2, L3, . . . , a corresponding second image (e.g. the second image R1) of the plurality of second images R1, R2, R3, . . . , and a corresponding depth map (e.g. the depth map DP1) of the plurality of depth maps DP1, DP2, DP3, . . . . Meanwhile, the memory 112 of the portable three-dimensional scanner 100 is not necessary. Further, in another embodiment of the present invention, the memory 112 is integrated into the image processing unit 114. Further, in another embodiment of the present invention, the synchronization unit 106 and the depth map generation unit 110 are integrated into a monolithic chip. Further, in another embodiment of the present invention, the synchronization unit 106, the depth map generation unit 110, and the image processing unit 114 are integrated into a monolithic chip.

Figure 3:
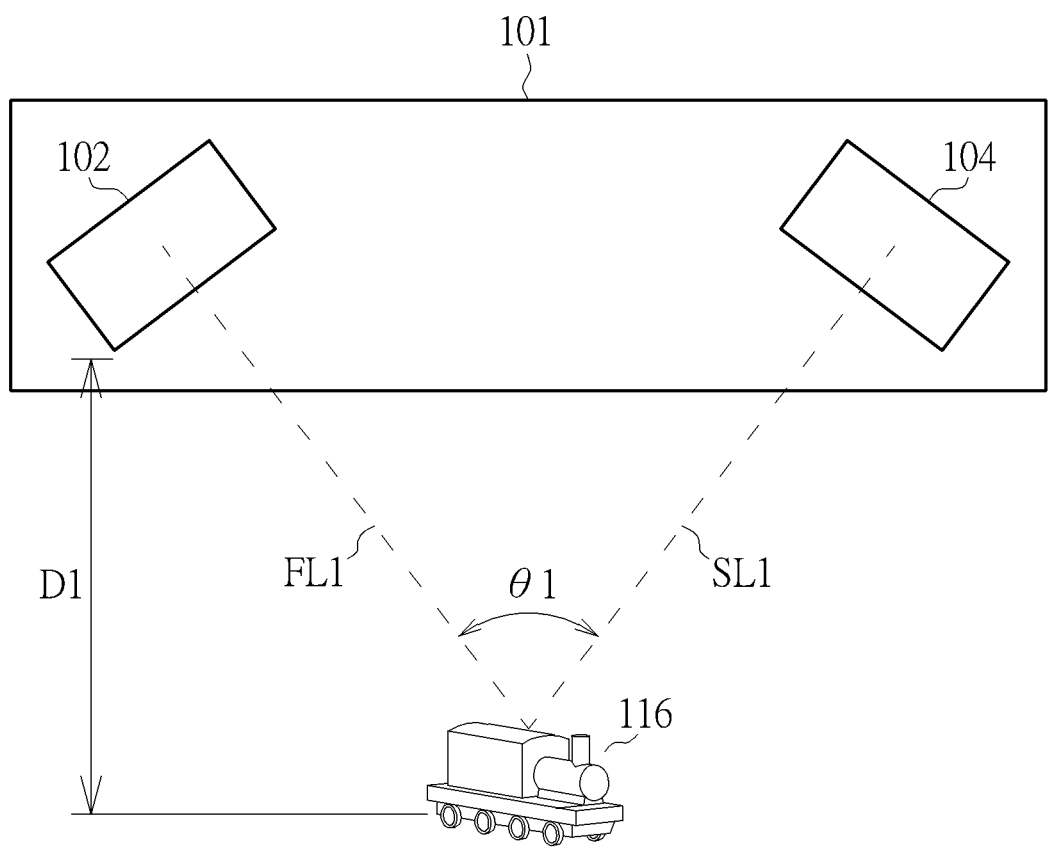
FIG. 3 is a diagram illustrating a distance between the first image sensing unit of the portable three-dimensional scanner and the object when the first image sensing unit captures the first image.
Figure 4:
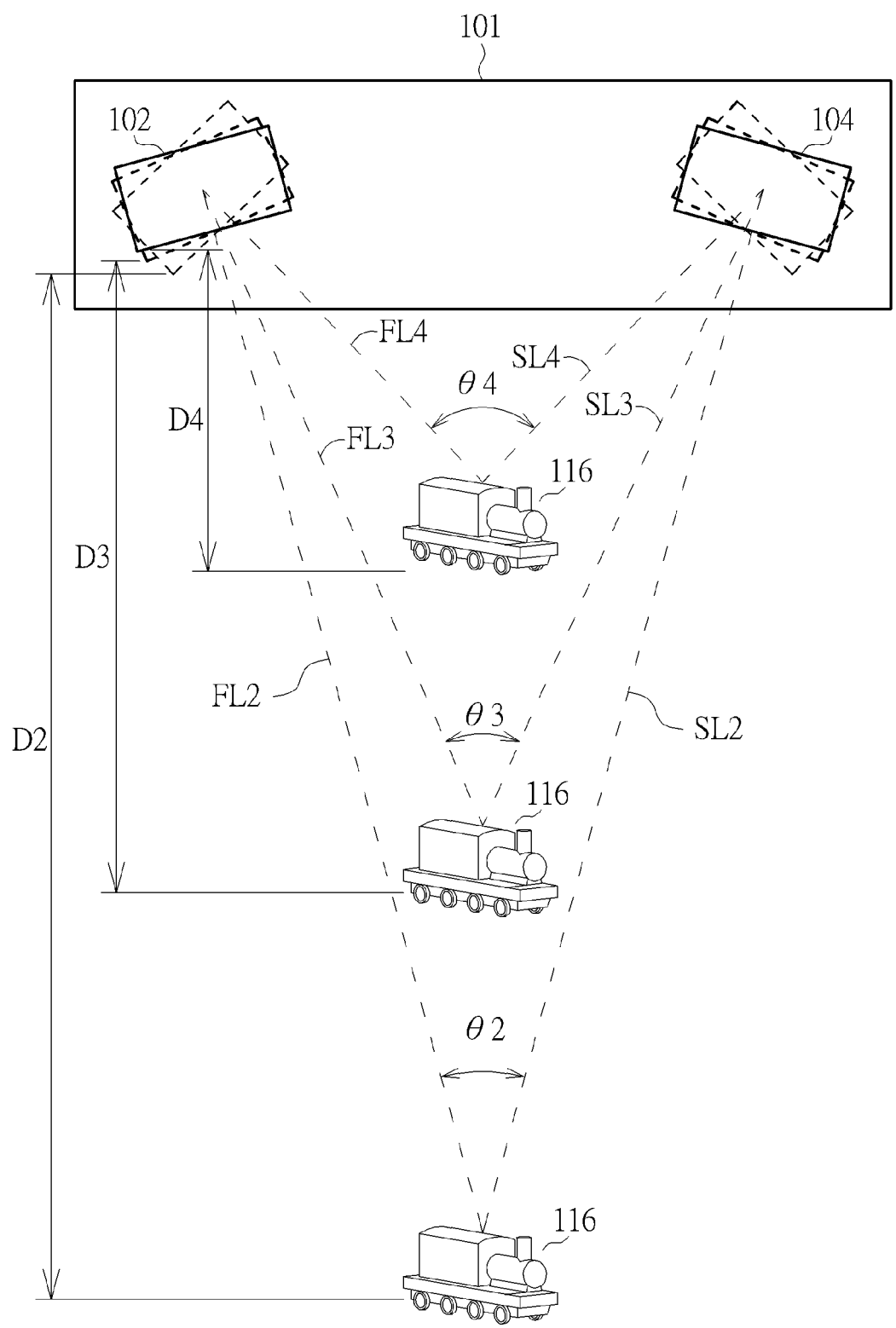
FIG. 4 is a diagram illustrating the first image sensing unit and the second image sensing unit being swung to make the object be always located at an intersection of a line determined by a center of the first image sensing unit and the object and a line determined by a center of the second image sensing unit and the object when a distance between the first image sensing unit and the object is varied with motion or rotation of the object.

Please refer to FIG. 3. FIG. 3 is a diagram illustrating a distance D1 between the first image sensing unit 102 of the portable three-dimensional scanner 100 and the object 116 when the first image sensing unit 102 captures the first image L1, wherein the distance D1 corresponds to the depth map DP1, and the distance D1 is varied with time. As shown in FIG. 3, when the first image sensing unit 102 captures the first image L1, the distance D1 exists between the first image sensing unit 102 and the object 116, an angle θ1 exists between a line FL1 determined by a center of the first image sensing unit 102 and the object 116 and a line SL1 determined by a center of the second image sensing unit 104 and the object 116, and the object 116 is located at an intersection of the line FL1 and the line SL1. In addition, because when the portable three-dimensional scanner 100 scans the object 116, the object 116 can be moved or rotated arbitrarily, a distance between the first image sensing unit 102 of the portable three-dimensional scanner 100 and the object 116 can be varied with motion or rotation of the object 116. That is to say, when a distance between the first image sensing unit 102 of the portable three-dimensional scanner 100 and the object 116 is changed with motion or rotation of the object 116, the first image sensing unit 102 and the second image sensing unit 104 can be swung to make the object 116 be always located at an intersection of a line determined by the center of the first image sensing unit 102 and the object 116 and a line determined by the center of the second image sensing unit 104 and the object 116 (As shown in FIG. 4). As shown in FIG. 4, when a distance D2 exists between the first image sensing unit 102 of the portable three-dimensional scanner 100 and the object 116, an angle θ2 exists between a line FL2 determined by the center of the first image sensing unit 102 and the object 116 and a line SL2 determined by the center of the second image sensing unit 104 and the object 116, wherein the distance D2 corresponds to a depth map DP2; when a distance D3 exists between the first image sensing unit 102 of the portable three-dimensional scanner 100 and the object 116, an angle θ3 exists between a line FL3 determined by the center of the first image sensing unit 102 and the object 116 and a line SL3 determined by the center of the second image sensing unit 104 and the object 116, wherein the distance D3 corresponds to a depth map DP3; and when a distance D4 exists between the first image sensing unit 102 of the portable three-dimensional scanner 100 and the object 116, an angle θ4 exists between a line FL4 determined by the center of the first image sensing unit 102 and the object 116 and a line SL4 determined by the center of the second image sensing unit 104 and the object 116, wherein the distance D4 corresponds to a depth map DP4. As shown in FIG. 4, because the first image sensing unit 102 and the second image sensing unit 104 can be swung, no matter how the object 116 is moved or rotated, the portable three-dimensional scanner 100 can always make the object 116 be located at an intersection of a line determined by the center of the first image sensing unit 102 and the object 116 and a line determined by the center of the second image sensing unit 104 and the object 116. In addition, because the first image sensing unit 102 and the second image sensing unit 104 can be swung, compared to the prior art, a size of the object 116 can be less restricted. In addition, the portable three-dimensional scanner 100 further includes a lookup table 118, wherein the lookup table 118 is used for storing relationships between distances (e.g. the distances D1, D2, D3, . . . ) between the first image sensing unit 102 of the portable three-dimensional scanner 100 and the object 116, angles (e.g. the angles θ1, θ2, θ3, . . . ) determined by a line determined by the center of the first image sensing unit 102 and the object 116 and a line determined by the center of the second image sensing unit 104 and the object 116, and depth maps (e.g. the depth maps DP1, DP2, DP3, . . . ).

Figure 5:
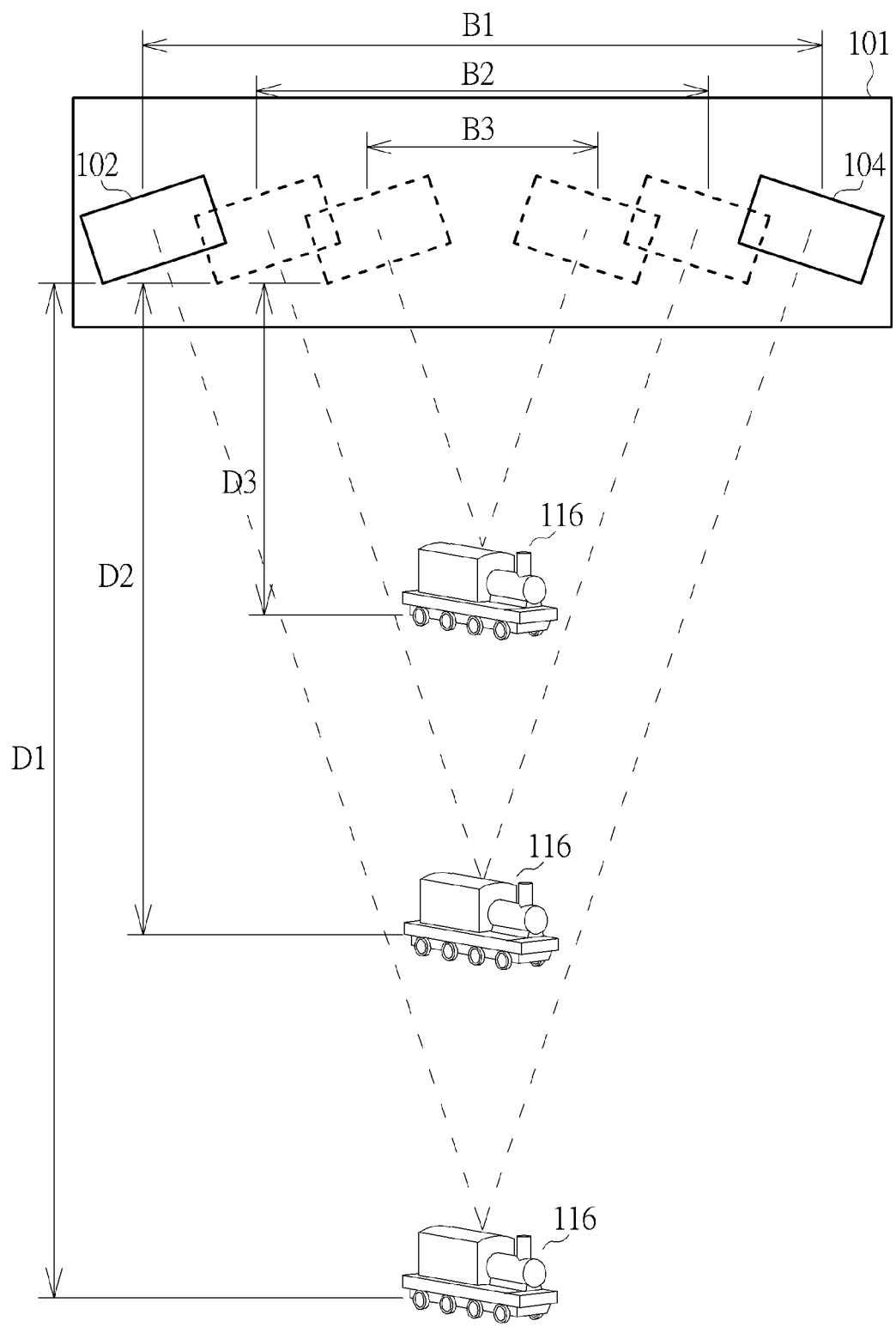
FIG. 5 is a diagram illustrating a baseline between first image sensing unit and second image sensing unit being varied with a distance between the first image sensing unit and the object according to another embodiment.

Please refer to FIG. 5. FIG. 5 is a diagram illustrating a baseline between first image sensing unit 102 and second image sensing unit 104 being varied with a distance between the first image sensing unit 102 and the object 116 according to another embodiment. As shown in FIG. 5, when the distance D1 exists between the first image sensing unit 102 of the portable three-dimensional scanner 100 and the object 116, a baseline B1 exists between the first image sensing unit 102 and the second image sensing unit 104; when a distance D2 exists between the first image sensing unit 102 of the portable three-dimensional scanner 100 and the object 116, a baseline B2 exists between the first image sensing unit 102 and the second image sensing unit 104; and when a distance D3 exists between the first image sensing unit 102 of the portable three-dimensional scanner 100 and the object 116, a baseline B3 exists between the first image sensing unit 102 and the second image sensing unit 104. As shown in FIG. 5, because a baseline existing between the first image sensing unit 102 and the second image sensing unit 104 can be varied with a distance between the first image sensing unit 102 of the portable three-dimensional scanner 100 and the object 116, no matter how the object 116 is moved or rotated, the portable three-dimensional scanner 100 can always make the object 116 be located at an intersection of a line determined by the center of the first image sensing unit 102 and the object 116 and a line determined by the center of the second image sensing unit 104 and the object 116. In addition, because a baseline between the first image sensing unit 102 and the second image sensing unit 104 can be varied with a distance between the first image sensing unit 102 of the portable three-dimensional scanner 100 and the object 116, compared to the prior art, the size of the object 116 can be less restricted. In addition, the lookup table 118 included by the portable three-dimensional scanner 100 can be used for storing relationships between distances (e.g. the distances D1, D2, D3, . . . ) existing between the first image sensing unit 102 of the portable three-dimensional scanner 100 and the object 116, baselines (e.g. the baselines B1, B2, B3, . . . ) existing between the first image sensing unit 102 and the second image sensing unit 104, and depth maps (e.g. the depth maps DP1, DP2, DP3, . . . ).

In addition, in another embodiment of the present invention, a baseline between the first image sensing unit 102 and the second image sensing unit 104 can be varied with a distance between the first image sensing unit 102 of the portable three-dimensional scanner 100 and the object 116, and the first image sensing unit 102 and the second image sensing unit 104 can also be swung with a distance between the first image sensing unit 102 of the portable three-dimensional scanner 100 and the object 116. Therefore, the lookup table 118 included by the portable three-dimensional scanner 100 is used for storing relationships distances (e.g. the distances D1, D2, D3, . . . ) between the first image sensing unit 102 of the portable three-dimensional scanner 100 and the object 116, angles (e.g. the angles θ1, θ2, θ3, . . . ) determined by a line determined by the center of the first image sensing unit 102 and the object 116 and a line determined by the center of the second image sensing unit 104 and the object 116, baselines (e.g. the baselines B1, B2, B3, . . . ) between the first image sensing unit 102 and the second image sensing unit 104, and depth maps (e.g. the depth map DP1, DP2, DP3, . . . ).

Figure 6:
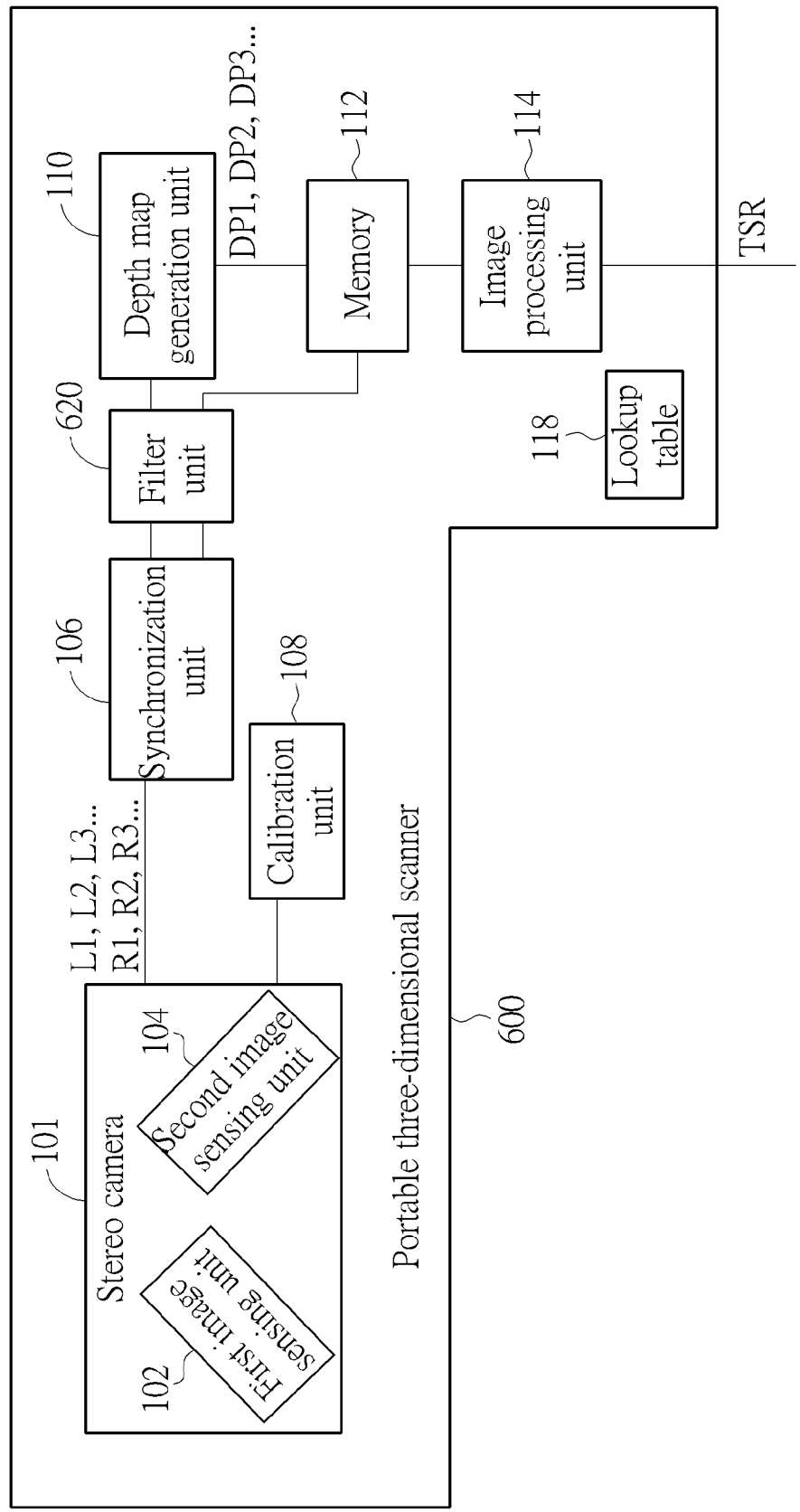
FIG. 6 is a diagram illustrating a portable three-dimensional scanner according to a second embodiment.

Please refer to FIG. 6. FIG. 6 is a diagram illustrating a portable three-dimensional scanner 600 according to a second embodiment. As shown in FIG. 6, a difference between the portable three-dimensional scanner 600 and the portable three-dimensional scanner 100 is that the portable three-dimensional scanner 600 further includes a filter unit 620, wherein the filter unit 620 is coupled between the first image sensing unit 102 and the second image sensing unit 104 of the stereo camera 101, the depth map generation unit 110, and the memory 112. The filter unit 620 is used for converting the plurality of first images L1, L2, L3, . . . captured by the first image sensing unit 102 and the plurality of second images R1, R2, R3, . . . captured by the second image sensing unit 104 into monochrome images. Therefore, the depth map generation unit 110 can generate the plurality of depth maps DP1, DP2, DP3, . . . according to the plurality of monochrome first images L1, L2, L3, . . . and the plurality of monochrome second images R1, R2, R3, . . . . In addition, subsequent operational principles of the portable three-dimensional scanner 600 are the same as those of the portable three-dimensional scanner 100, so further description thereof is omitted for simplicity.

Figure 7:
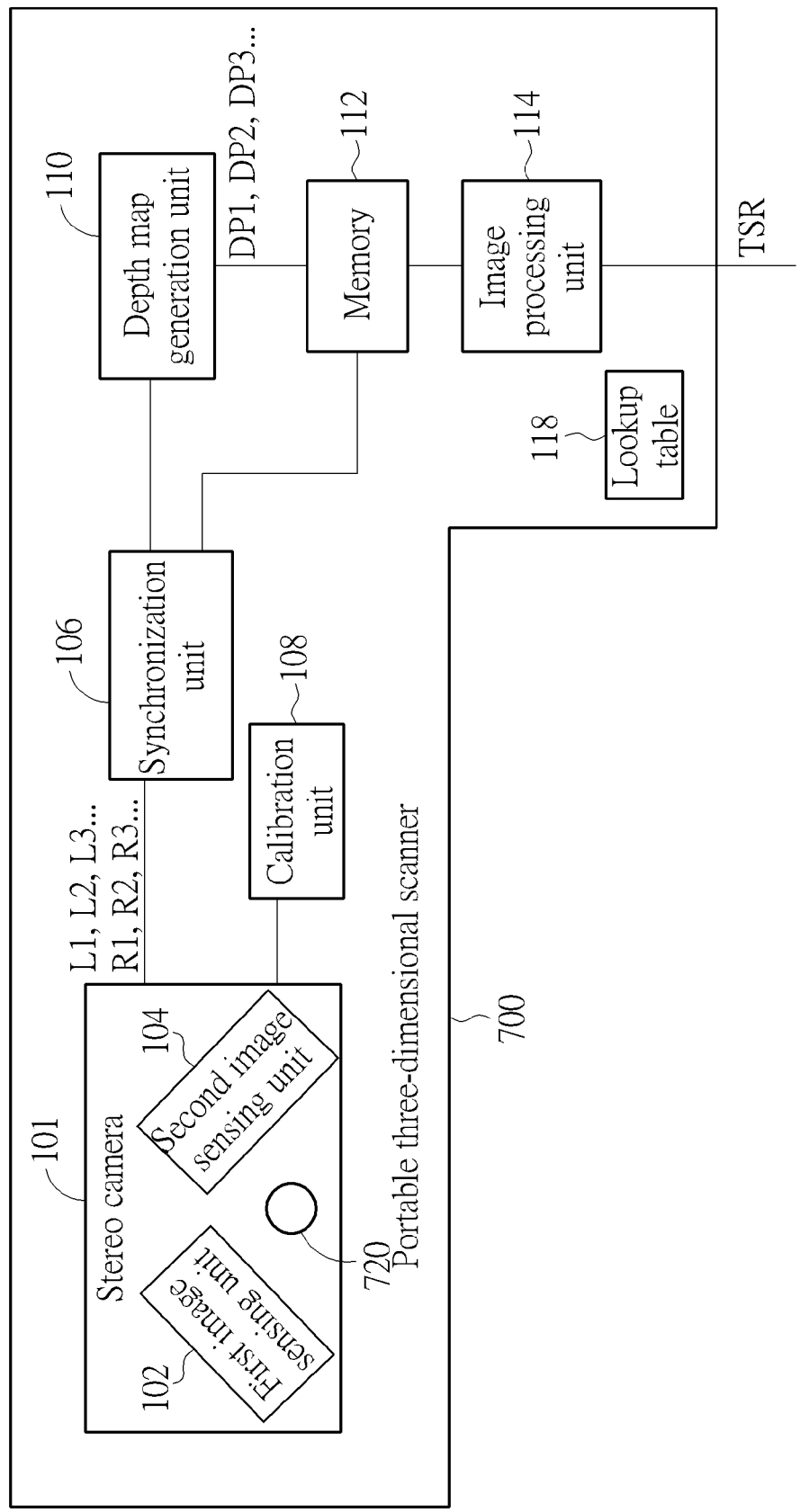
FIG. 7 is a diagram illustrating a portable three-dimensional scanner according to a third embodiment.
Figure 8:
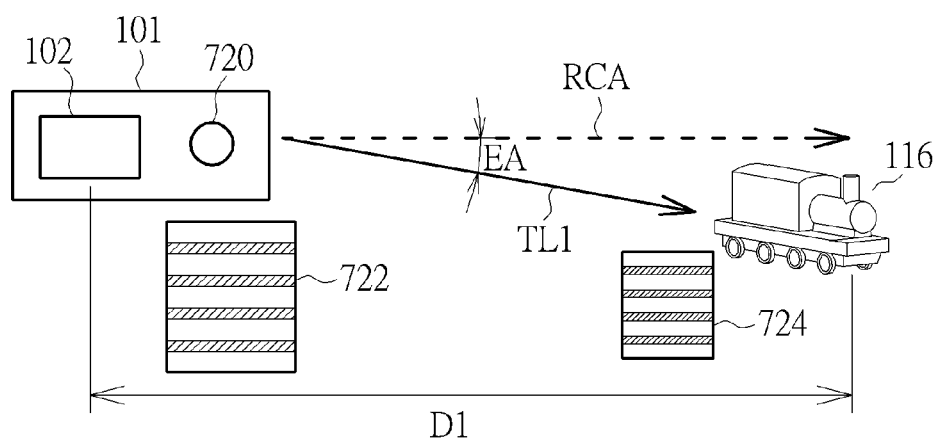
FIG. 8 is a diagram illustrating relationships between an emitting angle of a light source, the distance between the first image sensing unit of the portable three-dimensional scanner and the object, and a ratio of a size of a predetermined light pattern formed on a surface of the object to a size of a predetermined light pattern emitted by the light source.

Please refer to FIG. 7 and FIG. 8. FIG. 7 is a diagram illustrating a portable three-dimensional scanner 700 according to a third embodiment, and FIG. 8 is a diagram illustrating relationships between an emitting angle of a light source 720, the distance D1 between the first image sensing unit 102 of the portable three-dimensional scanner 700 and the object 116, and a ratio RA of a size of a predetermined light pattern 724 formed on a surface of the object 116 to a size of a predetermined light pattern 722 emitted by the light source 720. As shown in FIG. 7, a difference between the portable three-dimensional scanner 700 and the portable three-dimensional scanner 100 is that the portable three-dimensional scanner 700 further includes the light source 720, wherein the light source 720 can have different emitting angles. When the light source 720 emits the predetermined light pattern 722 (e.g. a strip pattern) to the object 116, the first image sensing unit 102 captures a plurality of first images L1, L2, L3, . . . including the object 116, and the second image sensing unit 104 captures a plurality of second images R1, R2, R3, . . . including the object 116. But, the present invention is not limited to the predetermined light pattern 722 being a strip pattern. As shown in FIG. 8, an emitting angle EA of the light source 720 is determined by a line TL1 determined by the light source 720 and the object 116 and a reference coordinate axis RCA, and when the distance D1 exists between the first image sensing unit 102 of the portable three-dimensional scanner 700 and the object 116 (the second image sensing unit 104 of the stereo camera 101 is not shown in FIG. 8), the ratio RA can be determined by the size of the predetermined light pattern 724 formed on the surface of the object 116 and the size of the predetermined light pattern 722 emitted by the light source 720, wherein the ratio RA corresponds the distance D1 and the emitting angle EA.

Figure 9:
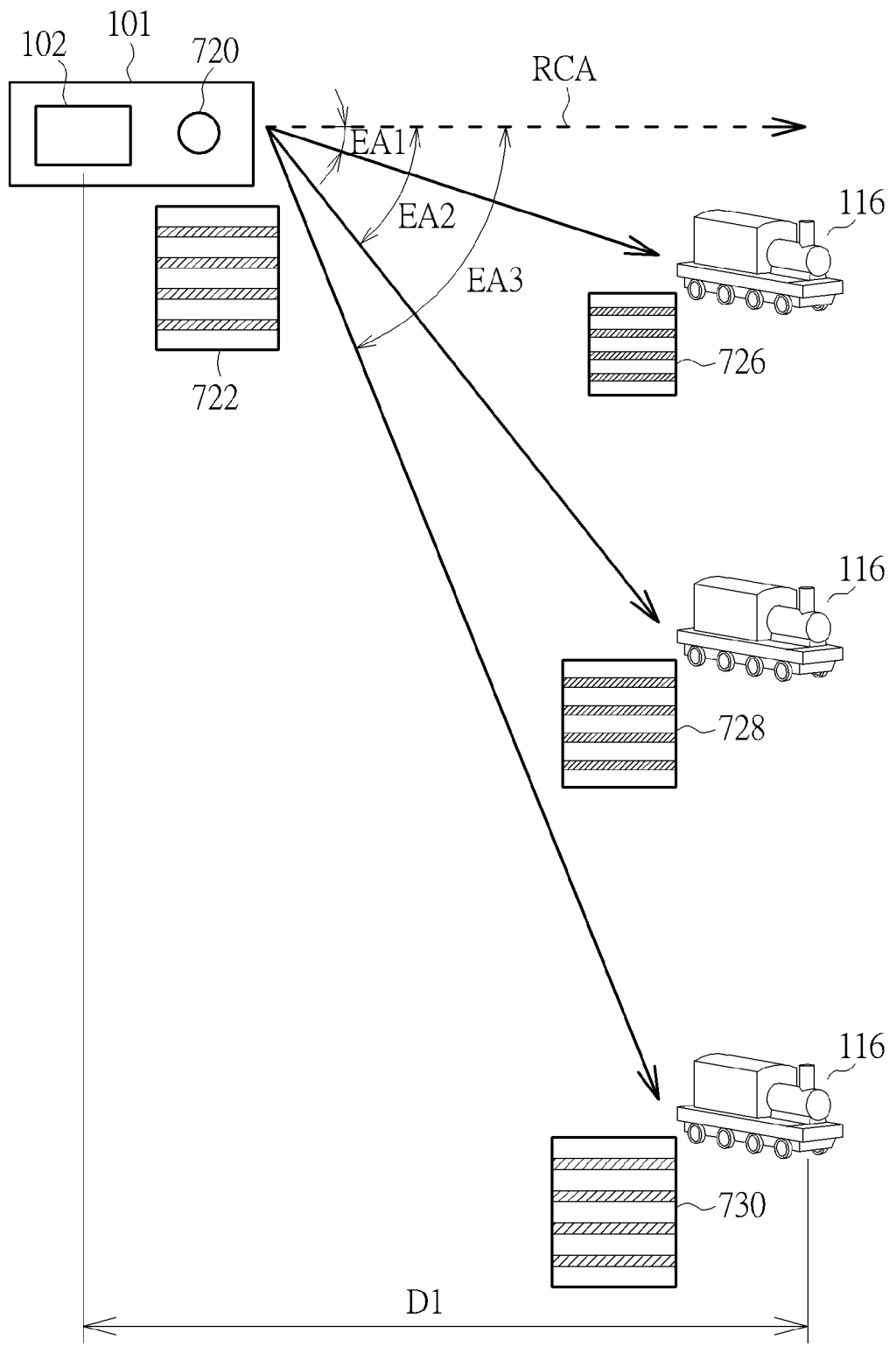
FIG. 9 is a diagram illustrating ratios determined by predetermined light patterns formed on the surface of the object and the size of the predetermined light pattern emitted by the light source being varied with different emitting angles of the light source when the distance exists between the first image sensing unit of the portable three-dimensional scanner and the object and the light source has the different emitting angles.
Figure 10:
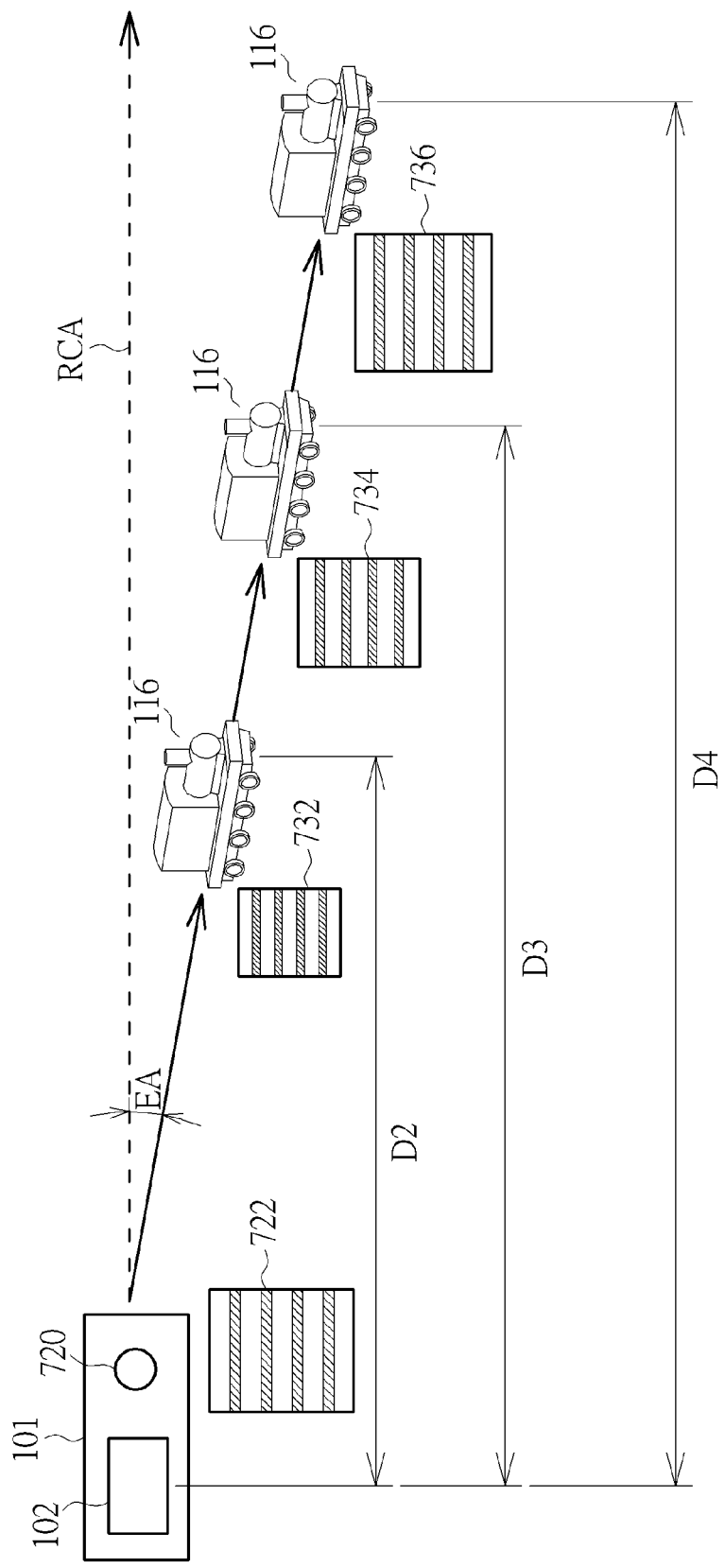
FIG. 10 is a diagram illustrating ratios determined by predetermined light patterns formed on the surface of the object and the size of the predetermined light pattern emitted by the light source being varied with different distances between the first image sensing unit of the portable three-dimensional scanner and the object when the different distances exist between the first image sensing unit of the portable three-dimensional scanner and the object and the light source has the emitting angle.

Please refer to FIG. 9 and FIG. 10. FIG. 9 is a diagram illustrating ratios determined by predetermined light patterns formed on the surface of the object 116 and the size of the predetermined light pattern 722 emitted by the light source 720 being varied with different emitting angles of the light source 720 when the distance D1 exists between the first image sensing unit 102 of the portable three-dimensional scanner 700 and the object 116 and the light source 720 has the different emitting angles, and FIG. 10 is a diagram illustrating ratios determined by predetermined light patterns formed on the surface of the object 116 and the size of the predetermined light pattern 722 emitted by the light source 720 being varied with different distances between the first image sensing unit 102 of the portable three-dimensional scanner 700 and the object 116 when the different distances exist between the first image sensing unit 102 of the portable three-dimensional scanner 700 and the object 116 and the light source 720 has the emitting angle EA. As shown in FIG. 9, when the distance D1 exists between the first image sensing unit 102 of the portable three-dimensional scanner 700 and the object 116 and the light source 720 has an emitting angle EA1 (the second image sensing unit 104 of the stereo camera 101 is not shown in FIG. 9), a ratio RA1 can be determined by a size of a predetermined light pattern 726 formed on the surface of the object 116 and the size of the predetermined light pattern 722 emitted by the light source 720; when the distance D1 exists between the first image sensing unit 102 of the portable three-dimensional scanner 700 and the object 116 and the light source 720 has an emitting angle EA2, a ratio RA2 can be determined by a size of a predetermined light pattern 728 formed on the surface of the object 116 and the size of the predetermined light pattern 722 emitted by the light source 720; and when the distance D1 exists between the first image sensing unit 102 of the portable three-dimensional scanner 700 and the object 116 and the light source 720 has an emitting angle EA3, a ratio RA3 can be determined by a size of a predetermined light pattern 730 formed on the surface of the object 116 and the size of the predetermined light pattern 722 emitted by the light source 720, wherein the ratio RA1, the ratio RA2, and the ratio RA3 are different each other. As shown in FIG. 10, when the light source 720 has the emitting angle EA and the distance D2 exists between the first image sensing unit 102 of the portable three-dimensional scanner 700 and the object 116 (the second image sensing unit 104 of the stereo camera 101 is not shown in FIG. 10), a ratio RA4 can be determined by a size of a predetermined light pattern 732 formed on the surface of the object 116 and the size of the predetermined light pattern 722 emitted by the light source 720; when the light source 720 has the emitting angle EA and the distance D3 exists between the first image sensing unit 102 of the portable three-dimensional scanner 700 and the object 116, a ratio RA5 can be determined by a size of a predetermined light pattern 734 formed on the surface of the object 116 and the size of the predetermined light pattern 722 emitted by the light source 720; and when the light source 720 has the emitting angle EA and the distance D4 exists between the first image sensing unit 102 of the portable three-dimensional scanner 700 and the object 116, a ratio RA6 can be determined by a size of a predetermined light pattern 736 formed on the surface of the object 116 and the size of the predetermined light pattern 722 emitted by the light source 720, wherein the ratio RA4, the ratio RA5, and the ratio RA6 are different each other. Therefore, the lookup table 118 included in the portable three-dimensional scanner 700 is used for storing relationships between distances (e.g. the distances D1, D2, D3, . . . ) between the first image sensing unit 102 of the portable three-dimensional scanner 700 and the object 116, emitting angles (e.g. the emitting angles EA, EA1, EA2, EA3, . . . ) of the light source 720, ratios (e.g. the ratios RA, RA1, RA2, RA3, . . . ) determined by a size of a predetermined light pattern (e.g. the predetermined light patterns 722, 724, 726, 728, . . . ) formed on the surface of the object 116 and the size of the predetermined light pattern 722 emitted by the light source 720, and depth maps (e.g. the depth maps DP1, DP2, DP3, . . . ). In addition, subsequent operational principles of the portable three-dimensional scanner 700 are the same as those of the portable three-dimensional scanner 100, so further description thereof is omitted for simplicity In addition, in another embodiment of the present invention, the portable three-dimensional scanners 100, 600, 700 do not include the image processing unit 114, so the plurality of depth maps DP1, DP2, DP3, . . . generated by the depth map generation unit 110 according to the plurality of first images L1, L2, L3, . . . and the plurality of second images R1, R2, R3, . . . , and the plurality of first images L1, L2, L3, . . . and the plurality of second images R1, R2, R3, . . . are transmitted to an operation apparatus coupled to the portable three-dimensional scanners 100, 600, 700 through a mobile-industry-processor-interface (MIPI) or a universal serial bus (USB). Therefore, the operation apparatus coupled to the portable three-dimensional scanners 100, 600, 700 can generate and output the color three-dimensional scan result TSR corresponding to the object 116 according to the plurality of first images L1, L2, L3, . . . , the plurality of second images R1, R2, R3, . . . , and the plurality of depth maps DP1, DP2, DP3, . . . . In addition, in another embodiment of the present invention, the plurality of depth maps DP1, DP2, DP3, . . . generated by the depth map generation unit 110 according to the plurality of first images L1, L2, L3, . . . and the plurality of second images R1, R2, R3, . . . , and the plurality of first images L1, L2, L3, . . . and plurality of second images R1, R2, R3, . . . are transmitted to an operation apparatus located in a "cloud" through a Wireless Fidelity (WiFi), a wireless LAN (WLAN), a Zigbee (IEEE 802.15.4), a Bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+

(Ant+). Therefore, the operation apparatus located in the "cloud" can generate and output the color three-dimensional scan result TSR corresponding to the object 116 according to the plurality of first images L1, L2, L3, . . . , the plurality of second images R1, R2, R3, . . . , and the plurality of depth maps DP1, DP2, DP3, . . . .

Figure 11:
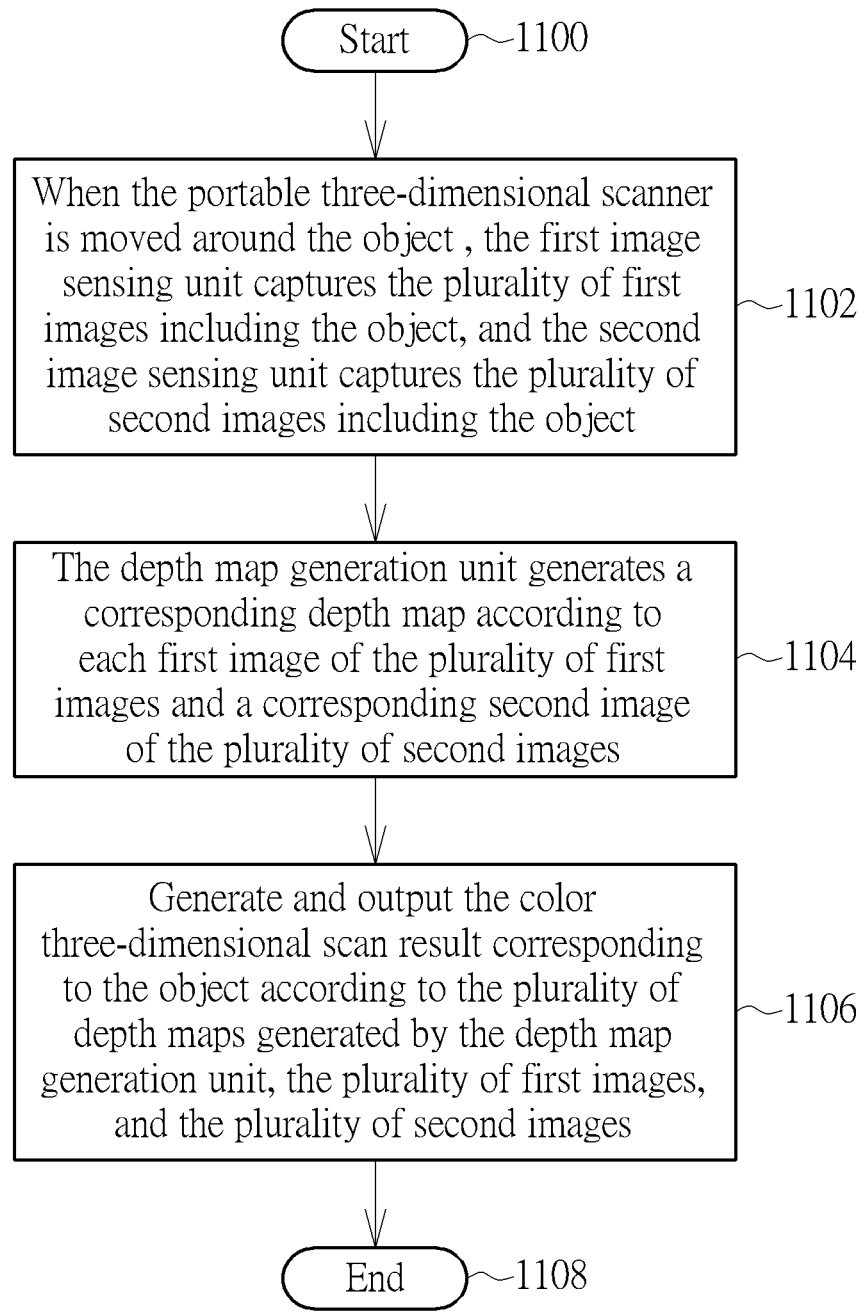
FIG. 11 is a flowchart illustrating a method of generating a three-dimensional scan result corresponding to an object according to a fourth embodiment.

Please refer to FIGS. 1-6 and FIG. 11. FIG. 11 is a flowchart illustrating a method of generating a three-dimensional scan result corresponding to an object according to a fourth embodiment. The method in FIG. 11 is illustrated using the portable three-dimensional scanner 100 in FIG. 1 and the portable three-dimensional scanner 600 in FIG. 6. Detailed steps are as follows:

Step 1100: Start.

Step 1102: When the portable three-dimensional scanner 100 is moved around the object 116, the first image sensing unit 102 captures the plurality of first images L1, L2, L3, . . . including the object 116, and the second image sensing unit 104 captures the plurality of second images R1, R2, R3, . . . including the object 116.

Step 1104: The depth map generation unit 110 generates a corresponding depth map according to each first image of the plurality of first images L1, L2, L3, . . . and a corresponding second image of the plurality of second images R1, R2, R3, . . . .

Step 1106: Generate and output the color three-dimensional scan result TSR corresponding to the object 116 according to the plurality of depth maps DP1, DP2, DP3, . . . generated by the depth map generation unit 110, the plurality of first images L1, L2, L3, . . . , and the plurality of second images R1, R2, R3, . . . .

Step 1108: End.

In Step 1102, when the portable three-dimensional scanner 100 is moved around the object 116 (as shown in FIG. 2), the first image sensing unit 102 captures the plurality of first images L1, L2, L3, . . . including the object 116, and the second image sensing unit 104 captures the plurality of second images R1, R2, R3, . . . including the object 116, wherein each first image (e.g. the first image L1) of the plurality of first images L1, L2, L3, . . . corresponds to a second image (e.g. the second image R1) of the plurality of second images R1, R2, R3, . . . , the plurality of first images L1, L2, L3, . . . and the plurality of second images R1, R2, R3, . . . are RGB images or YUV images, and the plurality of first images L1, L2, L3, . . . are left eye images and the plurality of second images R1, R2, R3, . . . are right eye images. But, the present invention is not limited to the plurality of first images L1, L2, L3, . . . and the plurality of second images R1, R2, R3, . . . being RGB images or YUV images. That is to say, the plurality of first images L1, L2, L3, . . . and the plurality of second images R1, R2, R3, . . . can be other types of color images. As shown in FIG. 1, the synchronization unit 106 outputs the first synchronization signal to each first image (e.g. the first image L1) of the plurality of first images L1, L2, L3, . . . , and the second synchronization signal to a corresponding second image (e.g. the second image R1) of the plurality of second images R1, R2, R3, . . . , wherein the frequency of the first synchronization signal outputted to each first image (e.g. the first image L1) of the plurality of first images L1, L2, L3, . . . by the synchronization unit 106 and the frequency of the second synchronization signal outputted to a corresponding second image (e.g. the second image R1) of the plurality of second images R1, R2, R3, . . . by the synchronization unit 106 are varied with the resolution of the first image L1 and the resolution of the second image R1, respectively. Before the first image sensing unit 102 outputs each first image (e.g. the first image L1) of the plurality of first images L1, L2, L3, . . . and the second image sensing unit 104 outputs a corresponding second image (e.g. the second image R1) of the plurality of second images R1, R2, R3, . . . , the calibration unit 108 can execute the calibration processing on the first image L1 and the second image R1, wherein the calibration processing includes a combination of the color space calibration and the assembly calibration. In Step 1104, as shown in FIG. 1, after the depth map generation unit 110 receives the plurality of first images L1, L2, L3, . . . and the plurality of second images R1, R2, R3, . . . , the depth map generation unit 110 can process the first image L1 and the second image R1 together to generate the depth map DP1 according to the first synchronization signal and the second synchronization signal. That is to say, the depth map generation unit 110 can generate the depth map DP1 according to each scan line of the first image L1 and a corresponding scan line of the second image R1 in turn. Thus, the depth map generation unit 110 can generate the plurality of depth maps DP1, DP2, DP3, . . . according to the plurality of first images L1, L2, L3, . . . and the plurality of second images R1, R2, R3, . . . . As shown in FIG. 2, because the portable three-dimensional scanner 100 is moved around the object 116 to scan the object 116, the plurality of depth maps DP1, DP2, DP3, . . . can correspond to different view angles. In Step 1106, as shown in FIG. 1, the image processing unit 114 can generate and output the color three-dimensional scan result TSR corresponding to the object 116 according to the plurality of first images L1, L2, L3, . . . , the plurality of second images R1, R2, R3, . . . , and the plurality of depth maps DP1, DP2, DP3, . . . . But, in another embodiment of the present invention, the image processing unit 114 real time generates and outputs a part of the color three-dimensional scan result TSR corresponding to the object 116 according to each first image (e.g. the first image L1) of the plurality of first images L1, L2, L3, . . . , a corresponding second image (e.g. the second image R1) of the plurality of second images R1, R2, R3, . . . , and a corresponding depth map (e.g. the depth map DP1). That is to say, the memory 112 of the portable three-dimensional scanner 100 is not necessary.

As shown in FIG. 3, when the first image sensing unit 102 captures the first image L1, the distance D1 exists between the first image sensing unit 102 of the portable three-dimensional scanner 100 and the object 116, the angle θ1 exists between the line FL1 determined by the center of the first image sensing unit 102 and the object 116 and the line SL1 determined by the center of the second image sensing unit 104 and the object 116, and the object 116 is located at the intersection of the line FL1 and the line SL1. In addition, because when the portable three-dimensional scanner 100 scans the object 116, the object 116 can be moved or rotated arbitrarily, a distance between the first image sensing unit 102 of the portable three-dimensional scanner 100 and the object 116 can be varied with motion or rotation of the object 116. Therefore, when a distance between the first image sensing unit 102 of the portable three-dimensional scanner 100 and the object 116 is changed with motion or rotation of the object 116, the first image sensing unit 102 and the second image sensing unit 104 can be swung to make the object 116 be always located at an intersection of a line determined by the center of the first image sensing unit 102 and the object 116 and a line determined by the center of the second image sensing unit 104 and the object 116 (As shown in FIG. 4). As shown in FIG. 4, because the first image sensing unit 102 and the second image sensing unit 104 can be swung, no matter how the object 116 is moved or rotated, the portable three-dimensional scanner 100 can always make the object 116 be located at an intersection of a line determined by the center of the first image sensing unit 102 and the object 116 and a line determined by the center of the second image sensing unit 104 and the object 116. In addition, because the first image sensing unit 102 and the second image sensing unit 104 can be swung, compared to the prior art, the size of the object 116 can be less restricted.

In addition, in another embodiment of the present invention (as shown in FIG. 5), because a baseline between the first image sensing unit 102 and the second image sensing unit 104 can be varied with a distance between the first image sensing unit 102 of the portable three-dimensional scanner 100 and the object 116, no matter how the object 116 is moved or rotated, the portable three-dimensional scanner 100 can always make the object 116 be located at an intersection of a line determined by the center of the first image sensing unit 102 and the object 116 and a line determined by the center of the second image sensing unit 104 and the object 116. In addition, because a baseline between the first image sensing unit 102 and the second image sensing unit 104 can be varied with a distance between the first image sensing unit 102 of the portable three-dimensional scanner 100 and the object 116, compared to the prior art, the size of the object 116 can be less restricted.

In addition, in another embodiment of the present invention, a baseline between the first image sensing unit 102 and the second image sensing unit 104 can be varied with a distance between the first image sensing unit 102 of the portable three-dimensional scanner 100 and the object 116, and the first image sensing unit 102 and the second image sensing unit 104 can also be swung with a distance between the first image sensing unit 102 of the portable three-dimensional scanner 100 and the object 116.

In addition, in another embodiment of the present invention (as shown in FIG. 6), the filter unit 620 further included in the portable three-dimensional scanner 600 can be used for converting the plurality of first images L1, L2, L3, . . . captured by the first image sensing unit 102 and the plurality of second images R1, R2, R3, . . . captured by the second image sensing unit 104 into monochrome images. Therefore, the depth map generation unit 110 can generate the plurality of depth maps DP1, DP2, DP3, . . . according to the plurality of monochrome first images L1, L2, L3, . . . and the plurality of monochrome second images R1, R2, R3, . . . .

In addition, in another embodiment of the present invention, portable three-dimensional scanner 100, 600 do not include the image processing unit 114, so the plurality of depth maps DP1, DP2, DP3, . . . generated by the depth map generation unit 110 according to the plurality of first images L1, L2, L3, . . . and the plurality of second images R1, R2, R3, . . . are transmitted to the operation apparatus coupled to the portable three-dimensional scanners 100, 600 through a mobile-industry-processor-interface (MIPI) or a universal serial bus (USB). Therefore, the operation apparatus coupled to the portable three-dimensional scanners 100, 600 can generate and output the color three-dimensional scan result TSR corresponding to the object 116 according to the plurality of first images L1, L2, L3, . . . , the plurality of second images R1, R2, R3, . . . , and the plurality of depth maps DP1, DP2, DP3, . . . . In addition, in another embodiment of the present invention, the plurality of depth maps DP1, DP2, DP3, . . . generated by the depth map generation unit 110 according to the plurality of first images L1, L2, L3, . . . and the plurality of second images R1, R2, R3, . . . are transmitted to the operation apparatus located in the "cloud" through a Wireless Fidelity (WiFi), a wireless LAN (WLAN), a Zigbee (IEEE 802.15.4), a Bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+ (Ant+).

Figure 12:
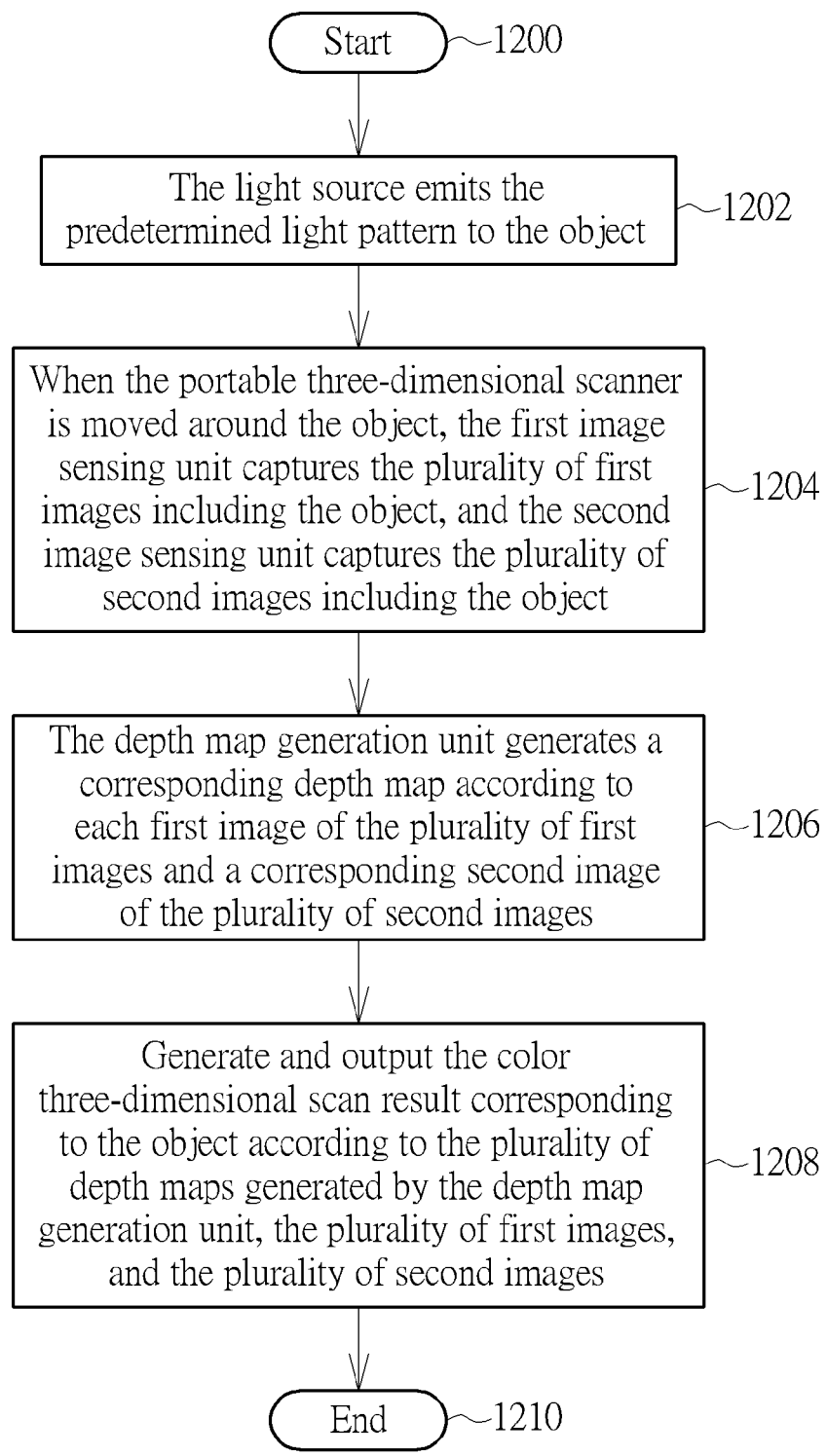
FIG. 12 is a flowchart illustrating a method of generating a three-dimensional scan result corresponding to an object according to a fifth embodiment.

Please refer to FIGS. 7-10 and FIG. 12. FIG. 12 is a flowchart illustrating a method of generating a three-dimensional scan result corresponding to an object according to a fifth embodiment. The method in FIG. 12 is illustrated using the portable three-dimensional scanner 700 in FIG. 7. Detailed steps are as follows:

Step 1200: Start.

Step 1202: The light source 720 emits the predetermined light pattern 722 to the object 116.

Step 1204: When the portable three-dimensional scanner 700 is moved around the object 116, the first image sensing unit 102 captures the plurality of first images L1, L2, L3, . . . including the object 116, and the second image sensing unit 104 captures the plurality of second images R1, R2, R3, . . . including the object 116.

Step 1206: The depth map generation unit 110 generates a corresponding depth map according to each first image of the plurality of first images L1, L2, L3, . . . and a corresponding second image of the plurality of second images R1, R2, R3, . . . .

Step 1208: Generate and output the color three-dimensional scan result TSR corresponding to the object 116 according to the plurality of depth maps DP1, DP2, DP3, . . . generated by the depth map generation unit 110, the plurality of first images L1, L2, L3, . . . , and the plurality of second images R1, R2, R3, . . . .

Step 1210: End.

As shown in FIG. 7, a difference between the embodiment in FIG. 12 and the embodiment in FIG. 11 is that when the light source 720 further included in the portable three-dimensional scanner 700 emits the predetermined light pattern 722 (e.g. a strip pattern) to the object 116, the first image sensing unit 102 captures a plurality of first images L1, L2, L3, . . . including the object 116, and the second image sensing unit 104 captures a plurality of second images R1, R2, R3, . . . including the object 116. But, the present invention is not limited to the predetermined light pattern 722 being a strip pattern. As shown in FIG. 8, the emitting angle EA of the light source 720 is determined by the line TL1 determined by the light source 720 and the object 116 and the reference coordinate axis RCA, and when the distance D1 exists between the first image sensing unit 102 of the portable three-dimensional scanner 700 and the object 116 (the second image sensing unit 104 of the stereo camera 101 is not shown in FIG. 8), the ratio RA can be determined by the size of the predetermined light pattern 724 formed on the surface of the object 116 and the size of the predetermined light pattern 722 emitted by the light source 720, wherein the ratio RA corresponds the distance D1 and the emitting angle EA.

As shown in FIG. 9, when a same distance (e.g. the distance D1) exists between the first image sensing unit 102 of the portable three-dimensional scanner 700 and the object 116, a ratio of a size of a predetermined light pattern (e.g. the predetermined light patterns 726, 728, 730) formed on the surface of the object 116 to the size of the predetermined light pattern 722 emitted by the light source 720 is varied with emitting angles (e.g. the emitting angles EA1, EA2, EA3) of the light source 720. As shown in FIG. 10, when the light source 720 has a same emitting angle (e.g. the emitting angle EA), a ratio of a size of a predetermined light pattern (e.g. the predetermined light patterns 732, 734, 736) formed on the surface of the object 116 to the size of the predetermined light pattern 722 emitted by the light source 720 is varied with a distance (e.g. the distances D2, D3, D4) between the first image sensing unit 102 of the portable three-dimensional scanner 700 and the object 116.

To sum up, the portable three-dimensional scanner and the method of generating a three-dimensional scan result corresponding to an object make the first image sensing unit and the second image sensing unit be swung to let the object be always located at an intersection of a line determined by the center of the first image sensing unit and the object and a line determined by the center of the second image sensing unit and the object, or make a baseline between the first image sensing unit and the second image sensing unit be varied with a distance between the first image sensing unit of the portable three-dimensional scanner and the object to let the object be always located at the intersection of the line determined by the center of the first image sensing unit and the object and the line determined by the center of the second image sensing unit and the object, or make the first image sensing unit and the second image sensing unit be swung and the baseline between the first image sensing unit and the second image sensing unit be varied with the distance between the first image sensing unit of the portable three-dimensional scanner and the object to let the object be always located at the intersection of the line determined by the center of the first image sensing unit and the object and the line determined by the center of the second image sensing unit and the object when the first image sensing unit captures the plurality of first images including the object and the second image sensing unit captures the plurality of second images including the object. In addition, the plurality of first images or the plurality of second images are color images, and the distance between the first image sensing unit of the portable three-dimensional scanner and the object is varied with time. Therefore, compared to the prior art, no matter how the object is moved or rotated, the portable three-dimensional scanner and the method provided by the present invention can always make the object be located at the intersection of the line determined by the center of the first image sensing unit and the object and the line determined by the center of the second image sensing unit and the object to obtain a better scanning resolution of the object. In addition, because the first image sensing unit and the second image sensing unit can be swung or the baseline between the first image sensing unit and the second image sensing unit is varied with the distance between the first image sensing unit of the portable three-dimensional scanner and the object, compared to the prior art, the size of the object can be less restricted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable three-dimensional scanner, comprising:
    at least two image sensors, wherein when the portable three-dimensional scanner is moved around an object, a first image sensor of the at least two image sensors captures a plurality of first images comprising the object, and a second image sensor of the at least two image sensors captures a plurality of second images comprising the object, wherein each first image of the plurality of first images corresponds to a second image of the plurality of second images, and when the first image sensor captures the each first image, a corresponding distance exists between the portable three-dimensional scanner and the object, wherein the plurality of first images or the plurality of second images are color images, and the corresponding distance is varied with time; and
    a depth map generator coupled to the at least two image sensors, wherein the depth map generator spatially processes the each first image and the second image together to generate a corresponding depth map through each scan line of the each first image and a corresponding scan line of the second image in turn according to a first synchronization signal inputted to the each first image and a second synchronization signal inputted to the second image, wherein a plurality of depth maps generated by the depth map generator according to the plurality of first images and the plurality of second images, the plurality of first images, and the plurality of second images are used for generating a color three-dimensional scan result corresponding to the object.

2. The portable three-dimensional scanner of claim 1, wherein when the first image sensor captures the each first image, a corresponding angle exists between the first line and the second line.

3. The portable three-dimensional scanner of claim 2, further comprising:
    a lookup table storing relations between the corresponding distance, the corresponding angle, and the corresponding depth map.

4. The portable three-dimensional scanner of claim 2, wherein when the first image sensor captures the each first image, a corresponding baseline exists between the first image sensor and the second image sensor.

5. The portable three-dimensional scanner of claim 4, further comprising:
    a lookup table storing relations between the corresponding distance, the corresponding angle, the corresponding baseline, and the corresponding depth map.

6. The portable three-dimensional scanner of claim 1, wherein when the first image sensor captures the each first image, a corresponding baseline exists between the first image sensor and the second image sensor.

7. The portable three-dimensional scanner of claim 6, further comprising:
    a lookup table storing relations between the corresponding distance, the corresponding baseline, and the corresponding depth map.

8. The portable three-dimensional scanner of claim 1, wherein the plurality of first images and the plurality of second images are RGB images or YUV images.

9. The portable three-dimensional scanner of claim 1, further comprising:
    a filter coupled to the first image sensor, the second image sensor, and the depth map generator, wherein the filter converts the plurality of first images and the plurality of second images into monochrome images.

10. A portable three-dimensional scanner, comprising:
    at least two image sensors, wherein when the portable three-dimensional scanner is moved around an object, a first image sensor of the at least two image sensors captures a plurality of first images comprising the object, and a second image sensor of the at least two image sensors captures a plurality of second images comprising the object, wherein each first image of the plurality of first images corresponds to a second image of the plurality of second images, and when the first image sensor captures the each first image, a corresponding distance exists between the portable three-dimensional scanner and the object, wherein the plurality of first images or the plurality of second images are color images, and the corresponding distance is varied with time;
- a depth map generator spatially processing the each first image and the second image together to generate a corresponding depth map through each scan line of the each first image and a corresponding scan line of the second image in turn according to a first synchronization signal inputted to the each first image and a second synchronization signal inputted to the second image, wherein a plurality of depth maps generated by the depth map generator according to the plurality of first images and the plurality of second images, the plurality of first images, and the plurality of second images are used for generating a color three-dimensional scan result corresponding to the object; and
- a synchronization circuit coupled between the first image sensor, the second image sensor, and the depth map generator, wherein the synchronization circuit outputs the first synchronization signal to the each first image and the second synchronization signal to the second image.

11. The portable three-dimensional scanner of claim 10, wherein the first synchronization signal corresponds to an image block of a plurality of image blocks included in the each first image, and the second synchronization signal corresponds to a corresponding image block of a plurality of image blocks included in the second image.

12. The portable three-dimensional scanner of claim 1, further comprising:
- a register storing an image block of the each first image corresponding to each scan line of the first image sensor and a corresponding image block of the second image, wherein after the register completely stores image blocks of the each first image corresponding to scan lines of the first image sensor and corresponding image blocks of the second image, the register outputs the each first image and the second image.

13. The portable three-dimensional scanner of claim 1, further comprising:
- a calibration circuit coupled to the first image sensor and the second image sensor, wherein before the first image sensor outputs the each first image and the second image sensor outputs the second image, the calibration circuit executes calibration processing on the each first image and the second image.

14. The portable three-dimensional scanner of claim 13, wherein the calibration processing comprises a combination of a color space calibration and an assembly calibration.

15. The portable three-dimensional scanner of claim 10, further comprising:
- a memory coupled to the synchronization circuit and the depth map generator, wherein the memory stores the plurality of first images, the plurality of second images, and the plurality of depth maps.

16. The portable three-dimensional scanner of claim 15, further comprising:
- an image processor coupled to the memory, wherein the image processor generates and outputs the color three-dimensional scan result according to the plurality of first images, the plurality of second images, and the plurality of depth maps.

17. The portable three-dimensional scanner of claim 1, further comprising:
- a memory coupled to the first image sensor, the second image sensor, and the depth map generator, wherein the memory stores the plurality of first images, the plurality of second images, and the plurality of depth maps.

18. The portable three-dimensional scanner of claim 17, further comprising:
- an image processor coupled to the memory, wherein the image processor generates and outputs the color three-dimensional scan result according to the plurality of first images, the plurality of second images, and the plurality of depth maps.

19. The portable three-dimensional scanner of claim 1, wherein the plurality of first images, the plurality of second images, and the plurality of depth maps are transmitted to an operation apparatus coupled to the portable three-dimensional scanner through a mobile-industry-processor-interface (MIPI) or a universal serial bus (USB), and the operation apparatus generates the color three-dimensional scan result according to the plurality of first images, the plurality of second images, and the plurality of depth maps.

20. The portable three-dimensional scanner of claim 1, wherein the plurality of first images, the plurality of second images, and the plurality of depth maps are transmitted to an operation apparatus located in a cloud through a Wireless Fidelity (WiFi), a wireless LAN (WLAN), a Zigbee (IEEE 802.15.4), a bluetooth, a Wireless Wide Area Network (WWAN), a Global System for Mobile Communications (GSM), a General Packet Radio Service (GPRS), a third generation (3G), a fourth generation (4G), a fifth generation (5G), or an actor network theory+ (Ant+), and the operation apparatus generates the color three-dimensional scan result according to the plurality of first images, the plurality of second images, and the plurality of depth maps.

21. The portable three-dimensional scanner of claim 1, further comprising:
- a light source emitting a predetermined light pattern to the object, wherein when the corresponding distance exists between the first image sensor and the object, a ratio is determined according to a size of a predetermined light pattern formed on a surface of the object and a size of the predetermined light pattern emitted by the light source, wherein the light source has an emitting angle.

22. The portable three-dimensional scanner of claim 21, further comprising:
- a lookup table storing relationships of the corresponding distance, the ratio, the emitting angle, and the corresponding depth map.

23. The portable three-dimensional scanner of claim 1, wherein the object is moved or rotated.

24. A method of generating a three-dimensional scan result corresponding to an object, wherein a portable three-dimensional scanner applied to the method comprises at least two image sensors and a depth map generator, the method comprising:
- when the portable three-dimensional scanner is moved around the object, a first image sensor of the at least two image sensors captures a plurality of first images comprising the object, and a second image sensor of the at least two image sensors captures a plurality of second images comprising the object, wherein each first image of the plurality of first images corresponds to a second image of the plurality of second images, and when the first image sensor captures the each first image, a corresponding distance exists between the portable three-dimensional scanner and the object, wherein the plurality of first images or the plurality of second images are color images, and the corresponding distance is varied with time;

the depth map generator spatially processing the each first image and the second image together to generate a corresponding depth map through each scan line of the each first image and a corresponding scan line of the second image in turn according to a first synchronization signal inputted to the each first image and a second synchronization signal inputted to the second image; and generating and outputting a color three-dimensional scan result corresponding to the object according to a plurality of depth maps generated by the depth map generator, the plurality of first images, and the plurality of second images.

25. The method of claim 24, wherein an image processor further comprised in the portable three-dimensional scanner generates and outputs the color three-dimensional scan result corresponding to the object according to the plurality of depth maps generated by the depth map generator, the plurality of first images, and the plurality of second images.

26. The method of claim 25, wherein when the first image sensor captures the each first image, a corresponding angle exists between the first line and the second line.

27. The method of claim 26, wherein when the first image sensor captures the each first image, a corresponding baseline exists between the first image sensor and the second image sensor.

28. The method of claim 25, wherein when the first image sensor captures the each first image, a corresponding baseline exists between the first image sensor and the second image sensor.

29. The method of claim 25, further comprising:
a light source emitting a predetermined light pattern to the object, wherein when the corresponding distance exists between the portable three-dimensional scanner and the object, a ratio is determined according to a size of a predetermined light pattern formed on a surface of the object and a size of the predetermined light pattern emitted by the light source, wherein the light source has an emitting angle.

30. The method of claim 24, wherein an operation apparatus coupled to the portable three-dimensional scanner or an operation apparatus located in a cloud generates and outputs the color three-dimensional scan result corresponding to the object according to the plurality of depth maps generated by the depth map generator, the plurality of first images, and the plurality of second images.

31. The method of claim 30, wherein when the first image sensor captures the each first image, a corresponding angle exists between the first line and the second line.

32. The method of claim 31, wherein when the first image sensor captures the each first image, a corresponding baseline exists between the first image sensor and the second image sensor.

33. The method of claim 30, wherein when the first image sensor captures the each first image, a corresponding baseline exists between the first image sensor and the second image sensor.

34. The method of claim 30, further comprising:
a light source emitting a predetermined light pattern to the object, wherein when the corresponding distance exists between the portable three-dimensional scanner and the object, a ratio is determined according to a size of a predetermined light pattern formed on a surface of the object and a size of the predetermined light pattern emitted by the light source, wherein the light source has an emitting angle.

* * * * *